(12) United States Patent
Nassivera et al.

(10) Patent No.: US 10,287,438 B2
(45) Date of Patent: May 14, 2019

(54) COLOR-BLEED RESISTANT SILICA AND SILICATE PIGMENTS AND METHODS OF MAKING SAME

(71) Applicant: EVONIK DEGUSSA GMBH, Essen (DE)

(72) Inventors: Terry W. Nassivera, Gambrills, MD (US); Karl W. Gallis, Pennyville, MD (US)

(73) Assignee: Evonik Degussa GmbH, Essen (DE)

( * ) Notice: Subject to any disclaimer, the term of this patent is extended or adjusted under 35 U.S.C. 154(b) by 96 days.

(21) Appl. No.: 15/145,851

(22) Filed: May 4, 2016

(65) Prior Publication Data

US 2016/0326373 A1   Nov. 10, 2016

Related U.S. Application Data

(60) Provisional application No. 62/158,577, filed on May 8, 2015.

(51) Int. Cl.

| | | |
|---|---|---|
| C09C 1/28 | (2006.01) | |
| C09C 1/62 | (2006.01) | |
| C09C 1/40 | (2006.01) | |
| C09C 1/30 | (2006.01) | |
| C09B 67/02 | (2006.01) | |

(52) U.S. Cl.
CPC ............ *C09C 1/28* (2013.01); *C09B 67/0097* (2013.01); *C09C 1/309* (2013.01); *C09C 1/3063* (2013.01); *C09C 1/3072* (2013.01); *C09C 1/405* (2013.01); *C09C 1/62* (2013.01); *C01P 2002/84* (2013.01); *C01P 2004/61* (2013.01); *C01P 2006/10* (2013.01); *C01P 2006/12* (2013.01); *C01P 2006/14* (2013.01); *C01P 2006/19* (2013.01)

(58) Field of Classification Search
CPC ........ B01J 20/10; B01J 20/16; B01J 20/3248; C02F 1/281; C02F 1/288; C02F 2101/103; C02F 2101/106; C02F 2101/16; C02F 2101/22; C02F 2101/306; C02F 2101/308; C02F 2101/32; C02F 2101/345
See application file for complete search history.

(56) References Cited

U.S. PATENT DOCUMENTS 4,492,686 A    1/1985  Guillon et al.
4,780,356 A   10/1988  Otouma et al.
(Continued)

FOREIGN PATENT DOCUMENTS

CN    1609148 A         4/2005
CN    102847522   *     1/2013
(Continued)

OTHER PUBLICATIONS

Wang et al. "Structure directed reversible adsorption of organic dye on mesoporous silica in aqueous solution"; Microporous and Mesoporous Materials 97 (2006) 21-26.*

(Continued)

*Primary Examiner* — Shuangyi Abu Ali
(74) *Attorney, Agent, or Firm* — Evonik Corporation

(57) ABSTRACT

Color-bleed resistant pigment particles containing an anionic dye, a quaternary ammonium compound, and a silica and/or silicate material having a negative zeta potential are disclosed. Related methods of making these colored pigment particles also are provided.

20 Claims, 1 Drawing Sheet

(56) References Cited

U.S. PATENT DOCUMENTS

| | | | |
|---|---|---|---|
| 4,830,911 A | 5/1989 | Kojima et al. | |
| 4,944,988 A | 7/1990 | Yasuda et al. | |
| 5,013,603 A | 5/1991 | Ogawa et al. | |
| 5,165,973 A | 11/1992 | Kojima et al. | |
| 5,213,873 A | 5/1993 | Yasuda et al. | |
| 5,268,097 A | 12/1993 | Girot et al. | |
| 5,320,897 A | 6/1994 | Kondo et al. | |
| 5,541,002 A | 7/1996 | Hosoi et al. | |
| 5,589,259 A | 12/1996 | Hosoi et al. | |
| 5,616,409 A | 4/1997 | Matsuda et al. | |
| 5,660,622 A | 8/1997 | Nikoloff | |
| 5,707,722 A | 1/1998 | Iqbal et al. | |
| 5,710,089 A * | 1/1998 | Khare | B01J 20/0244 502/407 |
| 5,753,082 A | 5/1998 | Yoshida et al. | |
| 5,925,176 A | 7/1999 | Rehman | |
| 5,976,231 A | 11/1999 | Schwarz | |
| 5,985,424 A | 11/1999 | DeMatte et al. | |
| 6,022,104 A | 2/2000 | Lin et al. | |
| 6,110,601 A | 8/2000 | Shaw-Klein et al. | |
| 6,140,406 A | 10/2000 | Schliesman et al. | |
| 6,214,449 B1 | 4/2001 | Otani et al. | |
| 6,348,256 B1 | 2/2002 | Rabasco et al. | |
| 6,468,337 B1 | 10/2002 | Gundlach et al. | |
| 6,492,005 B1 | 12/2002 | Ohbayashi et al. | |
| 6,689,740 B1 | 2/2004 | McGee et al. | |
| 6,780,559 B2 | 8/2004 | Veregin et al. | |
| 6,949,135 B2 | 9/2005 | Ishibashi et al. | |
| 7,435,450 B2 | 10/2008 | Chen et al. | |
| 7,638,166 B2 | 12/2009 | Wickramanayake | |
| 7,837,742 B2 | 11/2010 | Morrissey et al. | |
| 7,871,464 B2 | 1/2011 | Ono et al. | |
| 7,998,222 B2 | 8/2011 | Morrissey et al. | |
| 8,092,874 B2 | 1/2012 | Wexler et al. | |
| 8,456,733 B2 | 6/2013 | Fontana et al. | |
| 8,709,103 B2 | 4/2014 | Oguchi | |
| 8,747,968 B2 | 6/2014 | Nito et al. | |
| 8,752,948 B2 | 6/2014 | Tamai et al. | |
| 8,752,951 B2 | 6/2014 | Boris et al. | |
| 8,945,517 B2 | 2/2015 | Hagar et al. | |
| 2002/0045035 A1 | 4/2002 | Nojima et al. | |
| 2002/0063897 A1 | 5/2002 | Matsumoto | |
| 2002/0115773 A1 | 8/2002 | Katoh et al. | |
| 2002/0130943 A1 | 9/2002 | Katoh et al. | |
| 2002/0158951 A1 | 10/2002 | Tyvoll | |
| 2002/0189774 A1 | 12/2002 | Boylan | |
| 2003/0104175 A1 | 6/2003 | Koike et al. | |
| 2003/0114573 A1 | 6/2003 | Cuch et al. | |
| 2003/0118791 A1 | 6/2003 | Yoshimura et al. | |
| 2003/0137571 A1 | 7/2003 | Friedel et al. | |
| 2003/0175451 A1 | 9/2003 | Wickramanayake et al. | |
| 2003/0228428 A1 | 12/2003 | Kim et al. | |
| 2004/0027433 A1 | 2/2004 | Stork et al. | |
| 2004/0086666 A1 | 5/2004 | Yoshimura et al. | |
| 2004/0109052 A1 | 6/2004 | Suzuki et al. | |
| 2004/0115371 A1 | 6/2004 | Ushiku | |
| 2004/0258858 A1 | 12/2004 | Kaneko et al. | |
| 2005/0003113 A1 | 1/2005 | Chen et al. | |
| 2005/0013945 A1 | 1/2005 | Bringley et al. | |
| 2005/0019506 A1 | 1/2005 | Koike et al. | |
| 2005/0053858 A1 | 3/2005 | Yuasa et al. | |
| 2005/0058784 A1 | 3/2005 | Kaga et al. | |
| 2005/0124747 A1 | 6/2005 | Murase et al. | |
| 2005/0170109 A1 | 8/2005 | Chen et al. | |
| 2005/0186331 A1 | 8/2005 | Fujimoto et al. | |
| 2005/0208234 A1 | 9/2005 | Hubertus et al. | |
| 2005/0212885 A1 | 9/2005 | Kawano | |
| 2005/0230659 A1 * | 10/2005 | Hampden-Smith | C01B 3/326 252/189 |
| 2005/0256224 A1 | 11/2005 | Miyata et al. | |
| 2006/0001725 A1 | 1/2006 | Nagata et al. | |
| 2006/0003113 A1 | 1/2006 | Nakano et al. | |
| 2006/0057310 A1 | 3/2006 | Suzuki et al. | |
| 2006/0061643 A1 | 3/2006 | Furukawa et al. | |
| 2006/0062941 A1 | 3/2006 | Bi et al. | |
| 2006/0105004 A1 * | 5/2006 | Withiam | A61K 8/06 424/401 |
| 2006/0125909 A1 | 6/2006 | Hamada et al. | |
| 2006/0181587 A1 | 8/2006 | Bauer et al. | |
| 2006/0204687 A1 | 9/2006 | Iwasaki et al. | |
| 2006/0210732 A1 | 9/2006 | Hiyama et al. | |
| 2006/0249705 A1 | 11/2006 | Wang et al. | |
| 2006/0263550 A1 | 11/2006 | Nichols et al. | |
| 2007/0166474 A1 | 7/2007 | Nakano et al. | |
| 2007/0196598 A1 | 8/2007 | Koike et al. | |
| 2007/0202281 A1 | 8/2007 | Nelli | |
| 2007/0237911 A1 | 10/2007 | Nakano | |
| 2008/0075869 A1 | 3/2008 | Nelli | |
| 2008/0075898 A1 | 3/2008 | Ogata et al. | |
| 2008/0103245 A1 | 5/2008 | Endo et al. | |
| 2008/0241436 A1 | 10/2008 | Kobayashi | |
| 2009/0022910 A1 | 1/2009 | Teramae | |
| 2009/0035489 A1 | 2/2009 | Kaimoto | |
| 2009/0074996 A1 | 3/2009 | Ogata et al. | |
| 2009/0123675 A1 | 5/2009 | Shaw-Klein et al. | |
| 2009/0169761 A1 | 7/2009 | Szajewski et al. | |
| 2009/0169762 A1 | 7/2009 | Szajewski et al. | |
| 2009/0195579 A1 | 8/2009 | Tousi et al. | |
| 2009/0246421 A1 | 10/2009 | Kobayashi | |
| 2009/0324900 A1 | 12/2009 | Matsumoto et al. | |
| 2010/0015337 A1 | 1/2010 | Becker et al. | |
| 2010/0026773 A1 | 2/2010 | Schultz et al. | |
| 2010/0028571 A1 | 2/2010 | Schultz et al. | |
| 2010/0045760 A1 | 2/2010 | Kawakami et al. | |
| 2010/0136234 A1 | 6/2010 | Kobayashi | |
| 2010/0247817 A1 | 9/2010 | Nakano et al. | |
| 2010/0279035 A1 | 11/2010 | Namba et al. | |
| 2010/0291360 A1 | 11/2010 | Murakami et al. | |
| 2010/0330366 A1 | 12/2010 | Keiser et al. | |
| 2010/0331431 A1 | 12/2010 | Keiser et al. | |
| 2011/0023753 A1 | 2/2011 | Tateishi | |
| 2011/0030583 A1 | 2/2011 | Tateishi et al. | |
| 2011/0033401 A1 | 2/2011 | Morrissey et al. | |
| 2011/0058006 A1 | 3/2011 | Kobayashi | |
| 2011/0206871 A1 | 8/2011 | Nakano | |
| 2011/0212278 A1 | 9/2011 | Watanabe et al. | |
| 2012/0050432 A1 | 3/2012 | Kawakami | |
| 2013/0258011 A1 | 10/2013 | Boris et al. | |
| 2014/0123406 A1 | 5/2014 | Ikeda | |

FOREIGN PATENT DOCUMENTS

| | | |
|---|---|---|
| CN | 102847522 | 7/2014 |
| EP | 1 184 191 | 6/2002 |
| WO | WO 2001/074599 | 10/2001 |
| WO | WO 2006/063096 | 6/2006 |

OTHER PUBLICATIONS

International Search Report and the Written Opinion of the International Searching Authority in PCT/US2016/030676 dated Aug. 8, 2016, 13 pages.

Wei et al., entitled, "SN@silicate: an anionic dye sorbent and its reuse," J. Mater. Chem., 2012, 22, pp. 5715-5722.

Chemical and Engineering News, 63(5), 27,1985 (1 page).

George Halsey; Physical Adsorption on Non-Uniform Surfaces; The Journal of Chemical Physics; vol. 16, No. 10; Oct. 1948; (7 pages).

Stephen Brunauer, et al; Adsorption of Gases in Multimolecular Layers; Journal of the American Chemical Society; vol. 60, Feb. 1938; pp. 309-319 (11 pages).

* cited by examiner

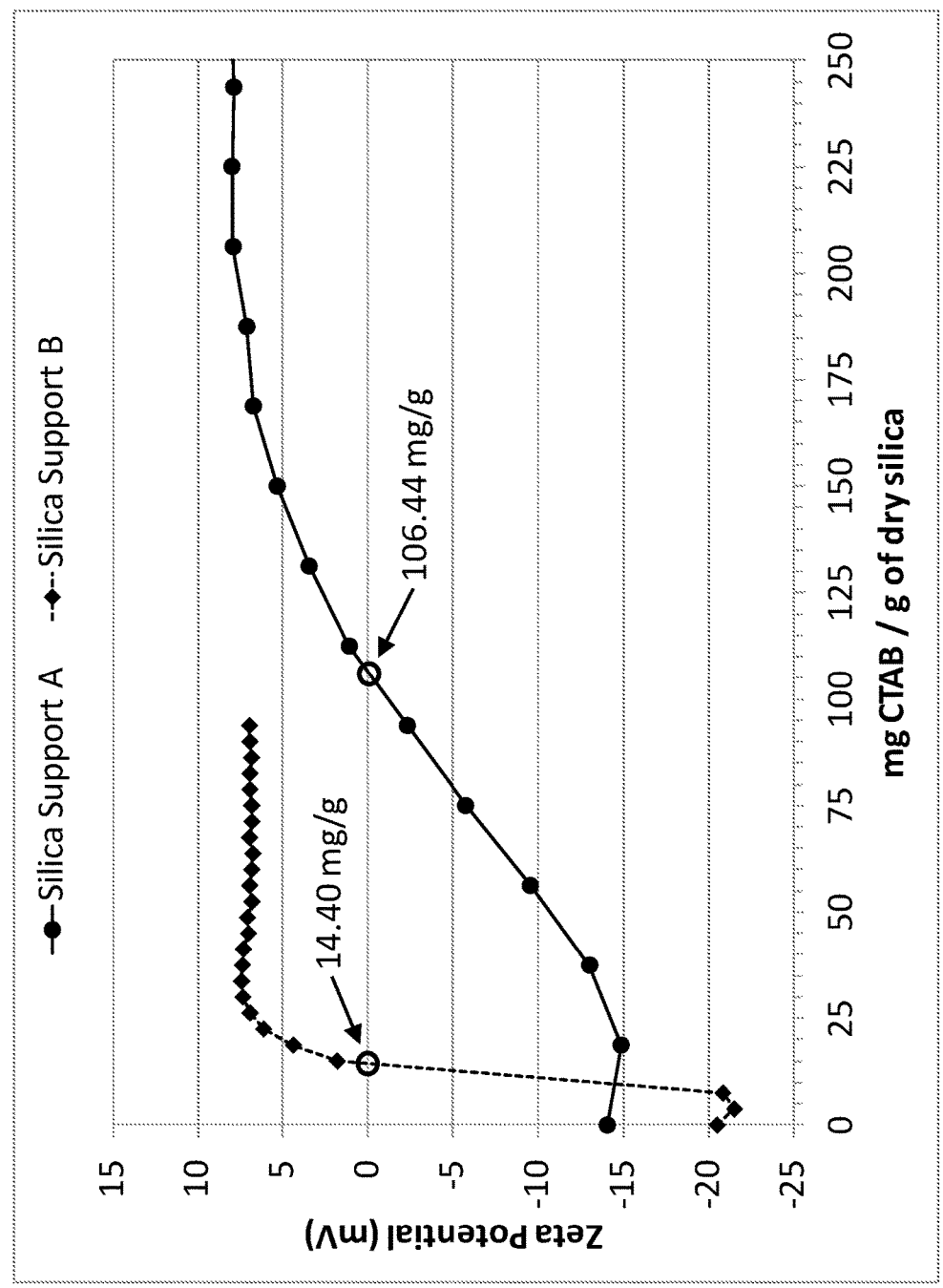

COLOR-BLEED RESISTANT SILICA AND SILICATE PIGMENTS AND METHODS OF MAKING SAME

REFERENCE TO RELATED APPLICATION

This application claims the benefit of U.S. Provisional Application Ser. No. 62/158,577, filed on May 8, 2015, the disclosure of which is incorporated herein by reference in its entirety.

BACKGROUND OF THE INVENTION

The present invention is directed to silica-based colored pigments and silicate-based colored pigments with improved color-bleed resistance.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Colored pigment particles are disclosed and described herein. In accordance with various aspects of this invention, such colored pigment particles can comprise (i) a silica and/or silicate material having a negative zeta potential, (ii) an anionic dye, and (iii) a quaternary ammonium compound.

Processes for producing colored pigment particles also are provided herein. A representative process can comprise (a) contacting a silica and/or silicate material having a negative zeta potential with a quaternary ammonium compound to form treated particles, and (b) contacting the treated particles with an anionic dye to form the colored pigment particles.

In these and other aspects of this invention, the ratio of the quaternary ammonium compound to the silica and/or silicate material, in total, often can range from about 1% to about 400% (or from about 10% to about 300%, or from about 50% to about 150%, and the like) of the amount of the quaternary ammonium compound sufficient to achieve a zero mV zeta potential of a 1 wt. % mixture of the dry silica and/or silicate material, in deionized water. Additionally or alternatively, the weight ratio of the anionic dye to the quaternary ammonium compound typically can range from about 0.01:1 to about 0.72:1, or from about 0.02:1 to about 0.36:1, or from about 0.04:1 to about 0.24:1, and so forth.

Beneficially, the colored pigment particles encompassed herein often can exhibit substantially no color bleed in water.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

BRIEF DESCRIPTION OF THE FIGURE

FIG. 1 presents plots of zeta potential (mV) versus the mg CTAB per gram of dry silica for Examples 1-2 using silica supports A-B.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter can be described such that, within particular aspects, a combination of different features can be envisioned. For each and every aspect and each and every feature disclosed herein, all combinations that do not detrimentally affect the designs, compositions, processes, or methods described herein are contemplated and can be interchanged, with or without explicit description of the particular combination. Accordingly, unless explicitly recited otherwise, any aspect or feature disclosed herein can be combined to describe inventive designs, compositions, processes, or methods consistent with the present disclosure.

While compositions and methods are described herein in terms of "comprising" various components or steps, the compositions and methods can also "consist essentially of" or "consist of" the various components or steps, unless stated otherwise. For example, colored pigment particles consistent with aspects of the present invention can comprise; alternatively, can consist essentially of; or alternatively, can consist of (1) a silica and/or silicate material, (2) an anionic dye, and (3) a quaternary ammonium compound.

The terms "a," "an," and "the" are intended to include plural alternatives, e.g., at least one, unless otherwise specified.

Generally, groups of elements are indicated using the numbering scheme indicated in the version of the periodic table of elements published in Chemical and Engineering News, 63(5), 27, 1985. In some instances, a group of elements can be indicated using a common name assigned to the group; for example, alkali metals for Group 1 elements, alkaline earth metals for Group 2 elements, and so forth.

The term "contacting" is used herein to refer to materials or components which can be blended, mixed, slurried, dissolved, reacted, treated, or otherwise contacted or combined in some other manner or by any suitable method. The materials or components can be contacted together in any order, in any manner, and for any length of time, unless otherwise specified.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein. As a representative example, the BET surface area of the colored pigment particles can be in certain ranges in various aspects of this invention. By a disclosure that the BET surface area can be in a range from about 50 to about 500 m²/g, the intent is to recite that the surface area can be any surface area within the range and, for example, can be equal to about 50, about 100, about 150, about 200, about 250, about 300, about 350, about 400, about 450, or about 500 m²/g. Additionally, the surface area can be within any range from about 50 to about 500 m²/g (for example, from about 100 to about 400 m²/g), and this also includes any combination of ranges between about 50 and about 500 m²/g (for example, the surface area can be in a range from 50 to about 150 m²/g or from about 250 to about 350 m²/g). Likewise, all other ranges disclosed herein should be interpreted in a manner similar to this example.

DETAILED DESCRIPTION OF THE INVENTION

Disclosed herein are color-bleed resistant pigment particles, methods for producing the colored pigment particles, and compositions and articles of manufacture containing the colored pigment particles.

Unexpectedly, it was found that certain combinations of silica and/or silicate materials, anionic dyes, and quaternary ammonium compounds, and the respective relative amounts of these components, can result in colored pigment particles with surprising color-bleed resistance properties. While not wishing to be bound by the following theory, it is believed that too little quaternary ammonium compound, based on the amount of the silica and/or silicate material, can result in pigment particles with very little, if any, color saturation without color bleed, while in contrast, too much quaternary ammonium compound is not necessarily better, unexpectedly resulting in unassociated dye complexes that are not associated with the silica and/or silica materials, and therefore, noticeable color bleed. Again, while not wishing to be bound by the following theory, it is believed that too little dye, based on the amount of quaternary ammonium compound, can result in pigment particles with faint color or low color saturation, while in contrast, too much dye can result in unassociated dye and noticeable color bleed.

Further, it was found that the colored pigment particles having the most beneficial combination of properties, unexpectedly, have the amount of the quaternary ammonium compound (based on the amount of the silica and/or silicate material) and the amount of the anionic dye (based on the amount of the quaternary ammonium compound) in specific proportions.

Colored Pigment Particles

Consistent with aspects of the present invention, colored pigment particles can comprise (i) a silica and/or silicate material having a negative zeta potential, (ii) an anionic dye, and (iii) a quaternary ammonium compound. In one aspect of this invention, the silica and/or silicate material having a negative zeta potential can comprise a silica material (one or more than one), while in another aspect, the silica and/or silicate material having a negative zeta potential can comprise a silicate material (one or more than one). Yet, in another aspect, the silica and/or silicate material having a negative zeta potential can comprise a mixture or combination of a silica material and a silicate material. Accordingly, mixtures or combinations of two or more different silica materials, two or more different silicate materials, or a silica material and a silicate material can be employed in accordance with this invention.

Consistent with aspects of this invention, the ratio of the quaternary ammonium compound to the silica and/or silicate material can be in a range from about 1% to about 400% of the amount (by weight) of the quaternary ammonium compound sufficient to achieve a zero mV zeta potential of a 1 wt. % mixture of the dry silica and/or silicate material in deionized water, as described herein. This ratio is based on the total amounts of the respective materials if mixtures or combinations of more than one silica material, more than one silicate material, a combination of silica and silicate materials, and/or more than one quaternary compound are employed. In one aspect, the ratio of the quaternary ammonium compound to the silica and/or silicate material can be in a range from about 10% to about 400%, from about 25% to about 400%, or from about 50% to about 400%. In another aspect, the ratio of the quaternary ammonium compound to the silica and/or silicate material can be in a range from about 10% to about 300%, from about 25% to about 300%, from about 25% to about 250%, from about 25% to about 200%. In yet another aspect, the ratio of the quaternary ammonium compound to the silica and/or silicate material can be in a range from about 25% to about 150%, from about 50% to about 300%, from about 50% to about 200%, from about 50% to about 150%, from about 75% to about 200%, from about 75% to about 175%, or from about 75% to about 150%. Other appropriate percentage ranges are readily apparent from this disclosure. As described herein, these percentages are based on the amount (by weight) of the quaternary ammonium compound sufficient to achieve a zero mV zeta potential of a 1 wt. % mixture of the dry silica and/or silicate material in deionized water. A correction is applied to compensate for the moisture content of the silica and/or silicate material based on the loss on drying (LOD) of the material at 105° C. for 2 hr. For example, if 100 g of a 1 wt. % silica suspension is prepared with a silica having a LOD of 6 wt. %, 1.06 g of the as-received silica would be diluted to 100 g with deionized water.

Often, the ratio of the weight of the anionic dye to the weight of the quaternary ammonium compound can fall within a range from about 0.01:1 to about 0.72:1. In some aspects, the weight ratio can be in a range from about 0.01:1 to 0.48:1; alternatively, from about 0.01 to about 0.24:1; alternatively, from about 0.02:1 to about 0.18:1; alternatively, from about 0.02:1 to about 0.48:1; alternatively, from about 0.02:1 to about 0.36:1; or alternatively, from about 0.02:1 to about 0.24:1. In other aspects, the weight ratio of the anionic dye to the quaternary ammonium compound can be in a range from about 0.04:1 to 0.72:1; alternatively, from about 0.04 to about 0.48:1; alternatively, from about 0.04:1 to about 0.36:1; alternatively, from about 0.04:1 to about 0.24:1; or alternatively, from about 0.04:1 to about 0.18:1. Other appropriate ranges for the ratio of the weight of the anionic dye to the weight of the quaternary ammonium compound are readily apparent from this disclosure.

In further aspects, colored pigment particles consistent with the present invention also can have any of the characteristics or properties provided below, and in any combination.

In some aspects, the colored pigment particles can have a small average particle size, and may often be referred to as particulates, while in on other aspects, the colored pigment particles can a large particles size, and may often be referred to as granules. Hence, the colored pigment particles can have an average particle size (d50) that often falls within a range from about 1 to about 1000 μm, such as, for instance, from about 1 to about 100, from about 1 to about 50, from about 1 to about 10, from about 2 to about 10, from about 3 to about 8, from about 100 to about 1000, from about 100 to about 500, from about 100 to about 250, from about 250 to about 1000, or from about 500 to about 1000 μm, and the like. Other appropriate ranges for the average particle size are readily apparent from this disclosure.

The surface area of the colored pigment particles is not limited to any particular range, however, the BET surface area of the colored pigment particles often falls within a range from about 1 to about 1200, from about 20 to about 600, or from about 50 to about 500 m$^2$/g. In some aspects, the BET surface area can be in a range from about 10 to about 500, from about 50 to about 1000, from about 50 to about 400, from about 100 to about 500, or from about 100 to about 250 m$^2$/g, and the like. Other appropriate ranges for the BET surface area are readily apparent from this disclosure.

Likewise, the oil absorption of the colored pigment particles is not limited to any particular range, but generally, the colored pigment particles have an oil absorption ranging from about 30 to about 600 cc/100 g. Alternatively, the oil absorption can be in a range from about 40 to about 500 cc/100 g; alternatively, from about 50 to about 500 cc/100 g; alternatively, from about 50 to about 400 cc/100 g; alternatively, from about 60 to about 250 cc/100 g; alternatively, from about 60 to about 200 cc/100 g; or alternatively, from about 70 to about 150 cc/100 g. Other appropriate ranges for the oil absorption are readily apparent from this disclosure.

In an aspect, the colored pigment particles can have a pH that often falls within a range from about 3 to about 10.5. In one aspect, the pH can be in a range from about 3 to about 9, or from about 4 to about 10. In another aspect, the pH can be in a range from about 5 to about 10, or from about 5 to about 9. In yet another aspect, the pH can be in a range from about 5 to about 8, or from about 6 to about 9. In still another aspect, the pH can be in a range about 6 to about 8, or from about 6.5 to about 7.5. Other appropriate ranges for the pH are readily apparent from this disclosure.

Consistent with aspects of this invention, the colored pigment particles can have a pack density that often falls within a range from about 3 to about 60, from about 3 to about 50, or from about 3 to about 40 lb/ft$^3$. In further aspects, the pack density can be in a range from about 5 to about 60, from about 5 to about 45, from about 6 to about 40, from about 10 to about 40, or from about 15 to about 35 lb/ft$^3$, and the like. Other appropriate ranges for the pack density are readily apparent from this disclosure.

The colored pigment particles described herein do not require a binder. In some aspects, therefore, the colored pigment particles are substantially free of a binder, i.e., containing less than 1 wt. % of a binder. In further aspects, the colored pigment particles can contain less than 0.5 wt. %, or less than 0.1 wt. %, or zero wt. % of the binder. Typical binders include polyvinyl alcohols and the like.

In some aspects, the colored pigment particles are wet, for instance, a slurry containing the colored pigment particles and greater than 40 wt. % (based on the weight of the colored pigment particles) of any suitable liquid, such as water or an organic solvent. The weight percent of the liquid can vary based on the desired % solids in the slurry, such as from 40 wt. % up to 100 wt. %, or more, based on the weight of the colored pigment particles.

In other aspects, the colored pigments particles are dry and/or free-flowing particles. As one of skill in the art would readily recognize, many silica/silicate materials contain a minimum amount of entrained water (e.g., 3-15 wt. %), even when considered to be dry. Hence, dry particles and/or free-flowing particles can contain less than 70 wt. %, less than 40 wt. %, less than 10 wt. %, or less than 5 wt. % (based on the weight of the colored particles) of any liquid, such as water or an organic solvent.

One component of the colored pigment particles is an anionic dye. Any suitable anionic dye can be used, such as anionic water soluble dyes. Illustrative and non-limiting examples of suitable anionic dyes can include Red 33, FD&C Red 3, FD&C Red 40, FD&C Blue 1, FD&C Yellow 5, FD&C Yellow 6, FD&C Green 3, and the like, as well as mixtures or combinations thereof.

Another component of the colored pigment particles is a quaternary ammonium compound. Any suitable quaternary ammonium compound can be used, such as a polymeric quaternary ammonium compound, or a non-polymeric quaternary ammonium compound, or a combination thereof. Illustrative and non-limiting examples of suitable polymeric quaternary ammonium compounds can include Poly-DADMAC (diallyldimethyl ammonium chloride polymer), Poly-Quat Q6/6 (polymer made from the reaction between N,N,N',N'-tetramethyl-1,6-diaminohexane and 1,6-dichlorohexane), PHMB (polyhexamethylene biguanide hydrochloride), WSCP (poly[oxyethylene-(dimethylimino) ethylene-(dimethylimino) ethylene dichloride]), and the like, as well as mixtures or combinations thereof. Illustrative and non-limiting examples of suitable non-polymeric quaternary ammonium compounds can include cetylpyridinium chloride (CPC), cetyltrimethylammonium bromide (CTAB), benzalkonium chloride (BAC), and the like, as well as mixtures or combinations thereof.

The silica and/or silicate material having a negative zeta potential can comprise any suitable silica and/or silicate material, non-limiting examples of which can include silica gels, fumed silicas, precipitated silicas, silicates, alkali metal aluminosilicates, alkaline earth metal-modified alkali metal aluminosilicates, and the like, as well mixtures or combinations thereof. Also included are silica and/or silicate materials having spherical particles, such as those demonstrated in U.S. Pat. No. 8,945,517, incorporated herein by reference in its entirety.

Representative silica gel materials include those produced by Grace (e.g., SYLOID, SYLODENT) and PQ Corporation (e.g., GASIL, SILCRON, SORBSIL), among others. Representative fumed silica materials include those produced by Cabot Corporation (e.g., CABOSIL) and Evonik Industries (e.g., AEROSIL), among others. Representative precipitated silica materials include those produced by J.M. Huber Corporation (e.g., ZEODENT, ZEOFREE, ZEOTHIX), Grace (e.g., SYLODENT), PQ Corporation (e.g., SORBOSIL), Solvay (e.g., TIXOSIL, ZEOSIL), and Evonik Industries (e.g., SIDENT, SIPERNAT), among others. Representative alkali metal aluminosilicate and alkaline earth metal-modified alkali metal aluminosilicate materials include those produced by J. M Huber Corporation (e.g., ZEOLEX, HYDREX, HUBERSORB), among others.

In some aspects, the silica and/or silicate material having a negative zeta potential can comprise any suitable silicate, non-limiting examples of which can include calcium silicate particles, magnesium silicate particles, and the like, as well as combinations thereof. In other aspects, the silica and/or silicate material can comprise any suitable aluminosilicate, non-limiting examples of which can include alkali metal aluminosilicates (e.g., sodium aluminosilicates), alkaline earth metal-modified alkali metal aluminosilicates (e.g., sodium magnesium aluminosilicate), and the like, as well as combinations thereof.

In these and other aspects, any of the suitable silica and/or silicate materials, independently, can be amorphous, can be synthetic, or can be both amorphous and synthetic.

In further aspects, the silica and/or silicate material having a negative zeta potential consistent with the present invention also can have any of the characteristics or properties provided hereinbelow, and in any combination. For instance, suitable ranges for the average particle size (d50), BET surface area, oil absorption, and pH of the silica and/or silicate material generally can be the same as those disclosed hereinabove for the colored pigment particles. Thus, the silica and/or silicate material can be characterized by an average particle size in a range from about 1 μm to about 1000 μm (or from about 1 μm to about 100 μm, or from about 100 μm to about 1000 μm, and the like); additionally or alternatively, a BET surface area in a range from about 1 $m^2/g$ to about 1200 $m^2/g$ (or from about 20 $m^2/g$ to about 600 $m^2/g$, or from about 50 $m^2/g$ to about 500 $m^2/g$, and the like); additionally or alternatively, an oil absorption value in a range from about 30 cc/100 g to about 600 cc/100 g (or from about 50 cc/100 g to about 400 cc/100 g, or from about 60 cc/100 g to about 250 cc/100 g, and the like); additionally or alternatively, a pH in a range from about 3 to about 10.5 (or from about 5 to about 9, or from about 6 to about 8, and the like).

The pore volume of the silica and/or silicate material is not particularly limited. However, the pore volume (i.e., mercury intrusion pore volume) often can fall within a range from about 0.2 to about 6 cc/g, such as, for instance, from about 0.3 to about 6, from about 0.5 to about 6, from about 0.4 to about 5, from about 0.5 to about 3, from about 0.7 to about 5, from about 0.7 to about 2.5, or from about 0.8 to about 3 cc/g, and the like. Other appropriate ranges for the pore volume are readily apparent from this disclosure.

It should be noted that the accessibility of the surfaces of the silica and/or silica material—and therefore, the desired BET surface area and pore volume (e.g., pore diameter)—can be impacted by the choice of the quaternary ammonium compound. For instance, a high molecular weight, polymeric quaternary ammonium compound may not be able to access all of the available surfaces of the silica and/or silicate material, due in part to molecular size. In contrast, a low molecular weight, non-polymeric quaternary ammonium compound can access more of the available surfaces of the silica and/or silicate material.

As disclosed herein, the silica and/or silicate material has a negative zeta potential at pH 8.0±0.5. Generally, the silica and/or silicate material can have a zeta potential in a range from about −2 mV to about −70 mV, from about −2 mV to about −45 mV, from about −5 mV to about −70 mV, from about −10 mV to about −65 mV, or from about −15 mV to about −65 mV; alternatively, the zeta potential can be in a range from about −10 mV to about −60 mV, from about −15 mV to about −50 mV, from about −20 mV to about −65 mV, or from about −20 mV to about −55 mV. Other appropriate ranges for the zeta potential are readily apparent from this disclosure.

Processes for Preparing Colored Pigment Particles

Processes for producing colored pigment particles are disclosed and described herein. Such processes to produce colored pigment particles can comprise (a) contacting a silica and/or silicate material having a negative zeta potential with a quaternary ammonium compound to form treated particles, and (b) contacting the treated particles with an anionic dye to form the colored pigment particles.

Generally, the features of the processes (e.g., the characteristics of the colored pigment particles, the characteristics of the silica and/or silicate material, the quaternary ammonium compound, the anionic dye, the conditions under which all the components are contacted and the colored pigment particles are formed, among others) are independently described herein and these features can be combined in any combination to further describe the disclosed processes. For example, the colored pigment particles can be characterized by any average particle size disclosed herein, any BET surface area disclosed herein, any oil absorption disclosed herein, any pH disclosed herein, and any pack density disclosed herein. The processes disclosed herein can be conducted in any suitable apparatus, such as a container or vessel with a mixing device, or a stirred tank.

Moreover, other process steps can be conducted before, during, and/or after any of the steps listed in the disclosed processes, unless stated otherwise. Additionally, colored pigment particles produced in accordance with any of the disclosed processes are within the scope of this disclosure and are encompassed herein.

In accordance with one aspect of the present invention, an aqueous slurry of a silica material can be contacted with the quaternary ammonium compound in step (a). In accordance with another aspect of the present invention, an aqueous slurry of a silicate material can be contacted with the quaternary ammonium compound in step (a). In accordance with yet another aspect of the present invention, an aqueous slurry of a mixture or combination of a silica and a silicate material can be contacted with the quaternary ammonium compound in step (a).

The quaternary ammonium compound can be contacted with the silica and/or silicate material at a variety of temperature and time periods. For instance, the temperature can be in a range from about 10° C. to about 80° C.; alternatively, from about 10° C. to about 70° C.; alternatively, from about 10° C. to about 60° C.; alternatively, from about 20° C. to about 80° C.; alternatively, from about 20° C. to about 60° C.; alternatively, from about 20° C. to about 50° C.; or alternatively, from about 25° C. to about 75° C. In these and other aspects, these temperature ranges also are meant to encompass circumstances where the process is conducted at a series of different temperatures (e.g., an initial temperature, a final temperature), instead of at a single fixed temperature, falling within the respective ranges. For instance, the quaternary ammonium compound and the silica and/or silicate material can be contacted initially at a lower temperature, and subsequently, the temperature can be increased to a higher, final temperature.

The duration of the step of contacting the quaternary ammonium compound with at least one of a silica material and a silicate material is not limited to any particular period of time. Hence, this step can be conducted, for example, in a time period ranging from as little as 15-30 seconds to as long as 24-48 hours, or more. The appropriate contacting time can depend upon, for example, the initial/final temperature, and the percent solids in the aqueous slurry, among other variables. Generally, however, the contacting step can be conducted in a time period that can be in a range from about 15 sec to about 48 hr, such as, for example, from about 1 min to about 24 hr, from about 1 min to about 8 hr, from about 15 min to about 6 hr, from about 5 min to about 2 hr, or from about 30 min to about 2 hr. Other conditions sufficient for conducting the processes described herein are readily apparent from this disclosure.

After the treated particles have been formed in step (a), the treated particles can be dried using any suitable technique, a representative example of which is spray drying.

In step (b), the treated particles can be contacted with an anionic dye to form the colored pigment particles. For instance, an aqueous slurry of the treated particles can be contacted with the anionic dye in step (b). The treated particles can be contacted with the anionic dye at a variety of temperature and time periods, such as described herein for step (a). If desired, the process for producing colored pigment particles can further comprise a step of removing excess dye from the colored pigment particles. This can be accomplished using any suitable technique, such as washing.

In certain aspects of this invention, the processes to produce colored pigment particles can further comprise a step of isolating the colored pigment particles. The step of isolating can be accomplished using any suitable technique, such as filtering, drying, and the like, although not limited thereto.

Additionally or alternatively, the processes to produce colored pigment particles can further comprise a step of wet milling the colored pigment particles. A bead milling process can be employed, although the wet milling step is not limited thereto.

Additionally or alternatively, the processes to produce colored pigment particles can further comprise a step of dry milling the colored pigment particles. A hammer milling process can be employed, although the dry milling step is not limited thereto.

Compositions Using Colored Pigment Particles

This invention is also directed to, and encompasses, any compositions, formulations, and articles of manufacture that contain any of the colored pigment particles disclosed herein (and their respective characteristics or features, such as average particle size, surface area, oil absorption, pH, and pack density), or any of the colored pigment particles (and their respective characteristics or features) produced by any of the processes disclosed herein.

Thus, a composition in one aspect of this invention can comprise a liquid and the colored pigment particles disclosed herein. This "liquid" can be any compound which, as a pure compound, is a liquid (not a solid or gas) at standard temperature (25° C.) and pressure (1 atm). Liquids also may be referred to herein as diluents. Water is an illustrative liquid or diluent contemplated herein, as are many organic solvents (e.g., aliphatic hydrocarbons, aromatic hydrocarbons, etc.), as would be recognized by those of skill in the art.

Other compositions are encompassed herein, and can include the colored pigment particles and any other additive or ingredient that is suitable for the intended end-use application of the colored pigment particles. Since the colored pigment particles can be virtually any color (e.g., yellow, red, blue, orange, green, and so forth, as well as combinations thereof), the end-use application or resultant article of manufacture containing the colored pigment particles is not particularly limited. In addition to uses as a feedstock material for further granulation or encapsulation, the colored pigment particles can be used in paints, coatings, toothpaste and dentifrice products, cosmetic products, and other end-use applications.

In an aspect, and unexpectedly, the resultant colored pigment particles disclosed herein can have substantially no color bleed in water. Such color-bleed resistant pigment particles are illustrated in the examples that follow hereinbelow. Since visual analysis of color bleed is very subjective, an analytical test was established to provide a quantitative determination to demonstrate that there is "substantially" no color bleed in water. In sum, a supernatant or leachate is separated from a 1 wt. % mixture of the colored pigment particles in deionized water, and the relative absorbance to deionized water is less than or equal to 0.05 using a UV-Vis spectrometer. In certain aspects of this invention, the relative absorbance can be less than or equal to 0.01, or less than or equal to 0.005. Additional information on color bleed measurements is provided hereinbelow.

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

The average particle size, or d50 or median particle size, refers to the particle size for which 50% of the sample has a smaller size and 50% of the sample has a larger size. Average particle size was determined via the laser diffraction method using a Horiba LA 300 instrument.

The BET surface areas and the pore volumes disclosed herein were determined on a Micromeritics TriStar II 3020 V1.03 using, respectively, the BET nitrogen adsorption method of Brunaur et al., J. Am. Chem. Soc., 60, 309 (1938), and BJH Desorption isotherms with a Halsey Faas Correction, Halsey, G. D., J. Chem. Phys. (1948), 16, pp. 931, and such techniques are well known to those skilled in the art.

Oil absorption values were determined in accordance with the rub-out method described in ASTM D281 using linseed oil (cc oil absorbed per 100 g of the particles). Generally, a higher oil absorption level indicates a higher structure particle, while a lower value typically indicates a lower structure particle.

The pH values disclosed herein (5% pH) were determined in an aqueous system containing 5 wt. % solids in deionized water using a pH meter.

The zeta potential was determined by making a 1 wt. % dry silica or silicate suspension in deionized water. The pH of this suspension was then adjusted to pH 8.0±0.5 using 0.5M sodium hydroxide solution, and the added weight was taken into account to adjust the weight percentage of dry silica/silicate in the suspension prior to measurement. The zeta potential was then measured using a ZetaProbe instrument manufactured by Colloidal Dynamics.

For pour and pack density, 20 g of the sample was placed into a 250 mL graduated cylinder with a flat rubber bottom. The initial volume was recorded and used to calculate the pour density by dividing it into the weight of sample used. The cylinder was then placed onto a tap density machine where it was rotated on a cam at 60 rpm. The cam is designed to raise and drop the cylinder a distance of 5.715 cm once per second, until the sample volume is constant, typically for 15 min. This final volume is recorded and used to calculate the pack density by dividing it into the weight of sample used.

Table I below provides the properties of precipitated silica A and precipitated silica B that were used to produce colored pigments particles in the examples that follow.

TABLE I

Characterization of Silica Support A and Silica Support B.

| Property | Silica A | Silica B |
|---|---|---|
| % LOD | 5.8 | 7.4 |
| BET Surface Area (m$^2$/g) | 379 | 23 |
| Median Particle Size (μm) | 11.4 | 8.0 |
| Oil Absorption (cc/100 g) | 234 | 43 |
| 5% pH | 6.5 | 7.6 |
| Pack Density (lb/ft$^3$) | 8.2 | 43.1 |
| Mercury Intrusion Pore Volume (cc/g) | 4.15 | 0.99 |
| Zeta potential (mV) | −20.5 | −14.1 |

Examples 1-2

Determination of the Amount of the Quaternary Ammonium Compound Sufficient to Achieve a Zero mV Zeta Potential To determine the appropriate level of quaternary ammonium for proper anionic dye immobilization, a zeta potential titration was conducted. Example 1 used silica support A, while Example 2 used silica support B. In the titration, a 1 wt. % suspension of the desired silica/silicate support was made by taking 1.6 g of dry silica/silicate and diluting to 160 g with de-ionized water. This suspension was magnetically stirred at 500 rpm for 10 minutes to allow the silica/silicate to fully wet out. If the resulting suspension had a pH of less than 8.0, it was adjusted to pH 8.0 using a 0.5 M sodium hydroxide solution. However, if the pH of the suspension was already greater than or equal to 8.0, it was not adjusted. Once the pH adjustment was completed (if used), the wt. % of silica in the suspension was recalculated by taking into account the mass of the 0.5 M sodium hydroxide solution used to adjust the pH. The suspension (or pH adjusted suspension) was then titrated using a dilute solution of the desired quaternary ammonium agent; in Examples 1-2, a 3 wt. % solution of cetyltrimethylammonium bromide (CTAB) was used. This CTAB solution was titrated in at equal increments small enough to allow for the zero mV zeta potential intercept to be determined. The weight of the quaternary ammonium required to reach zero mV and the dry weight of silica/silicate in the suspension were then utilized to determine the mg quaternary ammonium to g silica/silicate ratio that was defined as the amount of the quaternary ammonium compound sufficient to achieve a zero mV zeta potential for that particular combination of quaternary ammonium compound and silica/silicate support. FIG. 1 illustrates the zeta potential curves for Examples 1-2 (Silica Support A and Silica Support B) and the determination of the amount of the quaternary ammonium sufficient to achieve a zero mV zeta potential (zero intercept). If the capacity of a polymeric quaternary ammonium is of interest, such as Poly-DADMAC, a similar procedure was followed, but 8 g of the desired silica/silicate support was used to provide better resolution (and the amount of polymeric quaternary ammonium used was normalized to the same 1 wt. % suspension used for CTAB), since these polymeric materials may not be able to access a large amount of the internal particle surfaces.

Examples 3-54

Preparation of Colored Silica-Based Pigments and Determination of Color Bleed To determine the appropriate anionic dye to quaternary ammonium weight ratio for a given silica/silicate at a given percentage of quaternary ammonium loading, several five point series of dyed materials were made. An initial suspension of the desired silica/silicate support was made and pH adjusted in a similar fashion as the zeta potential titrations described in Examples 1-2. An appropriate amount of the stirred suspension to provide 0.5 g of dry silica/silicate was then placed in a series of vials which were magnetically stirred. For each series, the amount of quaternary ammonium fixing agent was set at a specific percentage of the amount required to achieve zero mV in the zeta potential titration, for example, 50%, 90%, 200%, etc., and that specific amount of the quaternary ammonium solution was added. Each point of the series was then dosed with an increasing amount of the anionic dye as a 1 wt. % solution. The suspensions were then dried in their entirety at 80-95° C., ground and placed into a new clean vial.

The resultant colored pigment particles were then assessed for color bleed by taking a 0.1 g portion and suspending it in 9.9 g of deionized water in a 45 mL centrifuge tube to obtain a 1 wt. % suspension of the colored pigment particles. The tube was then rotated for 30 minutes to allow for any color bleed to occur, and then centrifuged using a hanging bucket centrifuge at 5000 rpm for 10 minutes. Each supernatant was then placed in a clean tube and centrifuged for another 10 minutes to remove any residual particulates, and the supernatant was pipetted into a clean vial. The amount of color bleed was then assessed by measuring the absorbance of this supernatant compared to de-ionized water at the wavelength of maximum absorbance of the anionic dye, using a Perkin Elmer Lambda 35 UV-VIS with a 2.0 nm slit width and a 1 cm path length of sample. The maximum wavelength was confirmed via a full scan on a standard solution, for example, Red 33 had a maximum absorbance at a wavelength of 530 nm. If the absorbance of the resultant supernatant was less than 0.05, this was considered to be substantially no color bleed. For Red 33, this equated to a concentration of about 0.0001 wt. % in the supernatant.

Table II summarizes the compositions of the colored pigment particles of Examples 3-54, and the color bleed performance of the pigments. Using the techniques disclosed herein, colored pigment particles having a wide range of silica, quaternary ammonium, and anionic dye contents were produced. Generally, pigments produced from Silica A had higher color intensity than those produced from Silica B. The amount of anionic dye that results in color bleed can be impacted by the amount of the CTAB as well as the characteristics of the silica support. Examples 23-25 used a large relative amount of CTAB and exhibited relatively more color bleed than other comparable pigments. For example, pigments with 50-200% CTAB loadings typically had less color bleed. Example 7 demonstrates that pigments with lower CTAB loadings can result in color bleed if too much anionic dye is used.

Table III provides additional properties of the colored pigment particles of Examples 53-54. Beneficially, with the exception of BET surface area, the respective properties listed in Table III were comparable to those in Table I.

Examples 55-81

Preparation of Colored Silica or Silicate Pigments and Determination of Color Bleed Examples 55-81 were conducted to demonstrate the use of other silica/silicate supports, as well as the use of other anionic dyes and quaternary ammonium compounds. Table IV provides the properties of silica C, sodium aluminosilicate D, silica E, and silica F that were used to produce colored pigments particles in the examples that follow. The same procedure described for Examples 1-2 was employed to determine the appropriate amount of the desired quaternary ammonium compound to reach a 0 mV zeta potential on the selected support. This amount was then used to prepare dyed materials following the same procedure as described for Examples 3-54. The specific support, quaternary ammonium loading, and dye level for Examples 55-81 can be found in the tables, along with the corresponding pigment color bleed, if any (using the test method described herein, and modified to use the appropriate absorbance wavelength for the selected anionic dye).

Table V summarizes the compositions of the colored pigment particles of Examples 55-69, and the color bleed performance of the pigments. Using the techniques disclosed herein, colored pigment particles having a wide range of silica/silicate, quaternary ammonium, and anionic dye contents were produced. Examples 55-60 were made using silica C and aluminosilicate D, which have generally spheroidal particle shapes. These examples also demonstrated the use of a silicate support, which unlike the silica supports, exhibited significant color bleed when the quaternary ammonium level was less than 100%. Examples 61-69 used silica support E with a fixed quaternary ammonium level of 100%, but utilizing various anionic dyes at a total loading level of 0.12 mg of dye per mg of CTAB. Example 69 utilized a blend of two dyes—FD&C Blue #1 and FD&C Yellow #5—to produce a green pigment. With the exception of Examples 58-59, no color bleed was noted for these examples.

Table VI summarizes the compositions of the colored pigment particles of Examples 70-72, and the color bleed performance of these pigments. Examples 70-72 used silica support F, which had a very high BET surface area. These examples demonstrate the use of silica F with a lower molecular weight quaternary ammonium compound (CTAB), which could access the majority of the available surface area. The result was high color saturation and no color bleed with a quaternary ammonium level of 100%, and with the anionic dye loading at 0.12 mg of dye per mg of CTAB.

Table VII summarizes the compositions of the colored pigment particles of Examples 73-81, and the color bleed performance of these pigments. Examples 73-81 were produced with silica F (high surface area) and a higher molecular weight (polymeric) quaternary ammonium compound (<100,000 MW Poly-DADMAC), which likely could not access the majority of the available surface area of silica F. For this reason, the amount of quaternary ammonium needed to reach 0 mV was quite low (see Table IV). However, though the quaternary ammonium and the anionic dye may have been largely limited to the exterior surfaces of the silica F particles, the color saturation was still visibly good, but not typically as high as with CTAB. These examples were made using quaternary ammonium levels of 50%, 100%, and 150%, but utilizing various anionic dyes at a total loading level of 0.06 mg of dye per mg of the polymeric quaternary ammonium compound. In most cases, the pigments had minimal to no color bleed. It appeared that the use of the higher molecular weight (polymeric) quaternary ammonium was more sensitive to increased dye levels, but this appeared to improve as the quaternary ammonium level increased.

TABLE II

Summary of Examples 3-54.

| | Dyed Silica Composition | | | | Dyed Silica Color Bleed Testing | | |
|---|---|---|---|---|---|---|---|
| Example | Silica Support | % of the CTAB Loading to get to 0 mV | mg CTAB/ g Silica | mg Dye/ mg CTAB | Wt. % Pigment in DI Water | Visual Description of Supernatant | Supernatant Absorbance at 530 nm |
| 3 | A | 50 | 53.2 | 0.04 | 1.00 | No color bleed | 0.0009 |
| 4 | A | 50 | 53.2 | 0.08 | 1.00 | No color bleed | 0.0010 |
| 5 | A | 50 | 53.2 | 0.12 | 1.00 | No color bleed | 0.0007 |
| 6 | A | 50 | 53.2 | 0.24 | 1.00 | No color bleed | 0.0011 |
| 7 | A | 50 | 53.2 | 0.48 | 1.00 | Color bleed | 0.1008 |
| 8 | A | 90 | 95.8 | 0.04 | 1.00 | No color bleed | 0.0002 |
| 9 | A | 90 | 95.8 | 0.08 | 1.00 | No color bleed | 0.0003 |
| 10 | A | 90 | 95.8 | 0.12 | 1.00 | No color bleed | 0.0007 |
| 11 | A | 90 | 95.8 | 0.24 | 1.00 | No color bleed | 0.0008 |
| 12 | A | 90 | 95.8 | 0.48 | 1.00 | Very faint color bleed | 0.0081 |
| 13 | A | 200 | 212.9 | 0.04 | 1.00 | No color bleed | 0.0035 |
| 14 | A | 200 | 212.9 | 0.08 | 1.00 | No color bleed | 0.0044 |
| 15 | A | 200 | 212.9 | 0.12 | 1.00 | No color bleed | 0.0051 |
| 16 | A | 200 | 212.9 | 0.24 | 1.00 | No color bleed | 0.0016 |
| 17 | A | 200 | 212.9 | 0.48 | 1.00 | No color bleed | 0.0033 |
| 18 | A | 300 | 319.3 | 0.01 | 1.00 | No color bleed | 0.0011 |
| 19 | A | 300 | 319.3 | 0.08 | 1.00 | No color bleed | 0.0014 |
| 20 | A | 300 | 319.3 | 0.12 | 1.00 | No color bleed | 0.0017 |
| 21 | A | 300 | 319.3 | 0.24 | 1.00 | No color bleed | 0.0034 |
| 22 | A | 300 | 319.3 | 0.48 | 1.00 | No color bleed | 0.0027 |
| 23 | A | 400 | 425.8 | 0.01 | 1.00 | Very faint color bleed | 0.0074 |
| 24 | A | 400 | 425.8 | 0.08 | 1.00 | Faint color bleed | 0.0127 |
| 25 | A | 400 | 425.8 | 0.12 | 1.00 | Very faint color bleed | 0.0082 |
| 26 | A | 400 | 425.8 | 0.24 | 1.00 | No color bleed | 0.0045 |
| 27 | A | 400 | 425.8 | 0.48 | 1.00 | No color bleed | 0.0035 |
| 28 | B | 50 | 7.2 | 0.04 | 1.00 | No color bleed | 0.0000 |
| 29 | B | 50 | 7.2 | 0.08 | 1.00 | No color bleed | 0.0025 |
| 30 | B | 50 | 7.2 | 0.12 | 1.00 | No color bleed | 0.0033 |
| 31 | B | 50 | 7.2 | 0.24 | 1.00 | Faint color bleed | 0.0270 |
| 32 | B | 50 | 7.2 | 0.48 | 1.00 | Color bleed | 0.1784 |
| 33 | B | 90 | 13.0 | 0.04 | 1.00 | No color bleed | 0.0012 |
| 34 | B | 90 | 13.0 | 0.08 | 1.00 | No color bleed | 0.0000 |
| 35 | B | 90 | 13.0 | 0.12 | 1.00 | No color bleed | 0.0009 |
| 36 | B | 90 | 13.0 | 0.24 | 1.00 | Very faint color bleed | 0.0041 |
| 37 | B | 90 | 13.0 | 0.48 | 1.00 | Color bleed | 0.1807 |
| 38 | B | 200 | 28.8 | 0.04 | 1.00 | No color bleed | 0.0002 |
| 39 | B | 200 | 28.8 | 0.08 | 1.00 | No color bleed | 0.0000 |
| 40 | B | 200 | 28.8 | 0.12 | 1.00 | No color bleed | 0.0008 |

TABLE II-continued

Summary of Examples 3-54.

| | Dyed Silica Composition | | | | Dyed Silica Color Bleed Testing | | |
|---|---|---|---|---|---|---|---|
| Example | Silica Support | % of the CTAB Loading to get to 0 mV | mg CTAB/ g Silica | mg Dye/ mg CTAB | Wt. % Pigment in DI Water | Visual Description of Supernatant | Supernatant Absorbance at 530 nm |
| 41 | B | 200 | 28.8 | 0.24 | 1.00 | No color bleed | 0.0008 |
| 42 | B | 200 | 28.8 | 0.48 | 1.00 | Faint color bleed | 0.0133 |
| 43 | B | 300 | 43.2 | 0.01 | 1.00 | No color bleed | 0.0023 |
| 44 | B | 300 | 43.2 | 0.08 | 1.00 | No color bleed | 0.0028 |
| 45 | B | 300 | 43.2 | 0.12 | 1.00 | No color bleed | 0.0024 |
| 46 | B | 300 | 43.2 | 0.24 | 1.00 | No color bleed | 0.0035 |
| 47 | B | 300 | 43.2 | 0.48 | 1.00 | Very faint color bleed | 0.0040 |
| 48 | B | 400 | 57.6 | 0.01 | 1.00 | No color bleed | 0.0038 |
| 49 | B | 400 | 57.6 | 0.08 | 1.00 | Very faint color bleed | 0.0087 |
| 50 | B | 400 | 57.6 | 0.12 | 1.00 | Very faint color bleed | 0.0071 |
| 51 | B | 400 | 57.6 | 0.24 | 1.00 | Very faint color bleed | 0.0083 |
| 52 | B | 400 | 57.6 | 0.48 | 1.00 | Faint color bleed | 0.0101 |
| 53 | A | 100 | 106.4 | 0.12 | 1.00 | No color bleed | 0.0005 |
| 54 | B | 100 | 33.5 | 0.12 | 1.00 | No color bleed | 0.0006 |

TABLE III

Characterization of the Colored Pigments of Examples 53-54.

| Property | Example 53 | Example 54 |
|---|---|---|
| % LOD | 1.1 | 1.9 |
| BET Surface Area (m$^2$/g) | 232 | 18 |
| Median Particle Size (μm) | 9.3 | 7.7 |
| Oil Absorption (cc/100 g) | 235 | 48 |
| 5% pH | 6.8 | 7.9 |
| Pack Density (lb/ft$^3$) | 10.1 | 40.7 |

TABLE IV

Characterization of Silica Support C, Aluminosilicate Support D, Silica Support E, and Silica Support F.

| Property | Silica C | Silicate D | Silica E | Silica F |
|---|---|---|---|---|
| Material Type | Silica | Aluminosilicate | Silica | Silica |
| % LOD | 5.0 | 4.0 | 7.0 | 6.6 |
| BET Surface Area (m$^2$/g) | 368 | 274 | 138 | 605 |
| Median Particle Size (μm) | 5.3 | 6.9 | 13.0 | 3.35 |
| Oil Absorption (cc/100 g) | 92 | 93 | 254 | 204 |
| 5% pH | 7.5 | 7.3 | 7.2 | 6.5 |
| Pack Density (lb/ft$^3$) | 33.3 | 41.6 | 11.4 | 10.6 |
| Particle Shape | Spheroidal | Spheroidal | Irregular | Irregular |
| Mercury Intrusion Pore Volume (cc/g) | 1.28 | 0.98 | — | 2.48 |
| Zeta potential (mV) | −11.7 | −5.1 | −30.6 | −19.3 |
| mg CTAB/g Silica or Silicate to achieve 0 mV | 55.1 | 93.2 | 39.2 | 133.7 |
| mg Poly-DADMAC/g Silica or Silicate to achieve 0 mV | — | — | — | 10.7 |

TABLE V

Summary of Examples 55-69.

| | Dyed Silica/Silicate Composition | | | | | | Dyed Silica/Silicate Color Bleed Testing | | |
|---|---|---|---|---|---|---|---|---|---|
| Example | Silica/ Silicate Support | % of the CTAB Loading to get to 0 mV | mg CTAB/ g Silica | Dye used | mg Dye/ mg CTAB | Wt. % Pigment in DI Water | Visual Description of Supernatant | Absorbance Wavelength (nm) | Supernatant Absorbance |
| 55 | C | 50 | 27.6 | Red 33 | 0.12 | 1.00 | No color bleed | 530 | 0.0000 |
| 56 | C | 90 | 49.6 | Red 33 | 0.12 | 1.00 | No color bleed | 530 | 0.0000 |
| 57 | C | 200 | 110.3 | Red 33 | 0.12 | 1.00 | No color bleed | 530 | 0.0021 |
| 58 | D | 50 | 46.6 | Red 33 | 0.12 | 1.00 | Color bleed | 530 | 1.2170 |
| 59 | D | 90 | 83.9 | Red 33 | 0.12 | 1.00 | Color bleed | 530 | 0.8943 |
| 60 | D | 200 | 186.5 | Red 33 | 0.12 | 1.00 | No color bleed | 530 | 0.0000 |
| 61 | E | 100 | 39.2 | Blue #1 | 0.12 | 1.00 | No color bleed | 628 | 0.0009 |
| 62 | E | 100 | 39.2 | Blue #2 | 0.12 | 1.00 | No color bleed | 611 | 0.0003 |
| 63 | E | 100 | 39.2 | Green #3 | 0.12 | 1.00 | No color bleed | 624 | 0.0017 |

TABLE V-continued

Summary of Examples 55-69.

| | Dyed Silica/Silicate Composition | | | | | Dyed Silica/Silicate Color Bleed Testing | | | |
|---|---|---|---|---|---|---|---|---|---|
| | | % of the CTAB | | | | Wt. % | Visual | Absorbance | |
| Example | Silica/Silicate Support | Loading to get to 0 mV | mg CTAB/g Silica | Dye used | mg Dye/mg CTAB | Pigment in DI Water | Description of Supernatant | Wavelength (nm) | Supernatant Absorbance |
| 64 | E | 100 | 39.2 | Red #3 | 0.12 | 1.00 | No color bleed | 539 | 0.0012 |
| 65 | E | 100 | 39.2 | Red #40 | 0.12 | 1.00 | No color bleed | 506 | 0.0010 |
| 66 | E | 100 | 39.2 | Yellow #5 | 0.12 | 1.00 | No color bleed | 427 | 0.0005 |
| 67 | E | 100 | 39.2 | Yellow #6 | 0.12 | 1.00 | No color bleed | 483 | 0.0005 |
| 68 | E | 100 | 39.2 | Red 33 | 0.12 | 1.00 | No color bleed | 530 | 0.0010 |
| 69 | E | 100 | 39.2 | Blue #1 & Yellow#5 | 0.06 & 0.06 | 1.00 | No color bleed | 628 | 0.0004 |

TABLE VI

Summary of Examples 70-72.

| | Dyed Silica/Silicate Composition | | | | | Dyed Silica/Silicate Color Bleed Testing | | | |
|---|---|---|---|---|---|---|---|---|---|
| | | % of the CTAB | | | | Wt. % | Visual | Absorbance | |
| Example | Silica/Silicate Support | Loading to get to 0 mV | mg CTAB/g Silica | Dye used | mg Dye/mg CTAB | Pigment in DI Water | Description of Supernatant | Wavelength (nm) | Supernatant Absorbance |
| 70 | F | 100 | 133.7 | Red #3 | 0.12 | 1.00 | No color bleed | 539 | 0.0008 |
| 71 | F | 100 | 133.7 | Red #40 | 0.12 | 1.00 | No color bleed | 506 | 0.0008 |
| 72 | F | 100 | 133.7 | Red 33 | 0.12 | 1.00 | No color bleed | 530 | 0.0001 |

TABLE VII

Summary of Examples 73-81.

| | Dyed Silica/Silicate Composition | | | | | Dyed Silica/Silicate Color Bleed Testing | | | |
|---|---|---|---|---|---|---|---|---|---|
| | | % of the Poly-DADMAC | | | | Wt. % | Visual | Absorbance | |
| Example | Silica/Silicate Support | Loading to get to 0 mV | mg Poly-DADMAC/g Silica | Dye used | mg Dye/mg Poly-DADMAC | Pigment in DI Water | Description of Supernatant | Wavelength (nm) | Supernatant Absorbance |
| 73 | F | 50 | 5.3 | Red #3 | 0.06 | 1.00 | No color bleed | 539 | 0.0013 |
| 74 | F | 50 | 5.3 | Red #40 | 0.06 | 1.00 | Very faint color bleed | 506 | 0.0060 |
| 75 | F | 50 | 5.3 | Red 33 | 0.06 | 1.00 | Color bleed | 530 | 0.0470 |
| 76 | F | 100 | 10.7 | Red #3 | 0.06 | 1.00 | Very faint color bleed | 539 | 0.0025 |
| 77 | F | 100 | 10.7 | Red #40 | 0.06 | 1.00 | No color bleed | 506 | 0.0014 |
| 78 | F | 100 | 10.7 | Red 33 | 0.06 | 1.00 | Faint color bleed | 530 | 0.0140 |
| 79 | F | 150 | 16.0 | Red #3 | 0.06 | 1.00 | Very faint color bleed | 539 | 0.0040 |
| 80 | F | 150 | 16.0 | Red #40 | 0.06 | 1.00 | No color bleed | 506 | 0.0003 |
| 81 | F | 150 | 16.0 | Red 33 | 0.06 | 1.00 | Faint color bleed | 530 | 0.0140 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. Colored pigment particles comprising (i) a silica and/or silicate material having a negative zeta potential; (ii) an anionic dye; and (iii) a quaternary ammonium compound.

Aspect 2. A process to produce colored pigment particles, the process comprising (a) contacting a silica and/or silicate material having a negative zeta potential with a quaternary ammonium compound to form treated particles; and (b)

contacting the treated particles with an anionic dye to form the colored pigment particles.

Aspect 3. The process or pigment particles defined in aspect 1 or 2, wherein the ratio of the quaternary ammonium compound to the silica and/or silicate material (total) is in any suitable range, or in any range disclosed herein, e.g., from about 1% to about 400%, from about 50% to about 300%, from about 25% to about 250%, from about 75% to about 200%, etc., of the amount of the quaternary ammonium compound sufficient to achieve a zero mV zeta potential of a 1 wt. % mixture of the dry silica and/or silicate material in deionized water.

Aspect 4. The process or pigment particles defined in any one of the preceding aspects, wherein the weight ratio of the anionic dye is in any suitable range, or in any range of weight ratios disclosed herein, e.g., from about 0.01:1 to about 0.72:1, from about 0.01:1 to 0.48:1, from about 0.02 to about 0.24:1, from about 0.02:1 to about 0.36:1, from about 0.04:1 to about 0.24:1, from about 0.02:1 to about 0.18:1, etc., based on the weight of the quaternary ammonium compound.

Aspect 5. The process or pigment particles defined in any one of the preceding aspects, wherein the colored pigment particles are characterized by any suitable average particle size, or an average particle size in any range disclosed herein, e.g., from about 1 μm to about 1000 μm, from about 1 μm to about 100 μm, from about 100 μm to about 1000 μm, etc.

Aspect 6. The process or pigment particles defined in any one of the preceding aspects, wherein the colored pigment particles are characterized by any suitable BET surface area, or a BET surface area in any range disclosed herein, e.g., from about 1 $m^2/g$ to about 1200 $m^2/g$, from about 20 $m^2/g$ to about 600 $m^2/g$, from about 50 $m^2/g$ to about 500 $m^2/g$, etc.

Aspect 7. The process or pigment particles defined in any one of the preceding aspects, wherein the colored pigment particles are characterized by any suitable oil absorption, or an oil absorption value in any range disclosed herein, e.g., from about 30 cc/100 g to about 600 cc/100 g, from about 50 cc/100 g to about 400 cc/100 g, from about 60 cc/100 g to about 250 cc/100 g, etc.

Aspect 8. The process or pigment particles defined in any one of the preceding aspects, wherein the colored pigment particles are characterized by any suitable pH, or a pH in any range disclosed herein, e.g., from about 3 to about 10.5, from about 5 to about 9, from about 6 to about 8, etc.

Aspect 9. The process or pigment particles defined in any one of the preceding aspects, wherein the colored pigment particles are characterized by any suitable pack density, or a pack density in any range disclosed herein, e.g., from about 3 $lb/ft^3$ to about 60 $lb/ft^3$, from about 5 $lb/ft^3$ to about 45 $lb/ft^3$, from about 6 $lb/ft^3$ to about 40 $lb/ft^3$, etc.

Aspect 10. The process or pigment particles defined in any one of the preceding aspects, wherein the silica and/or silicate material is characterized by any suitable average particle size, or an average particle size in any range disclosed herein, e.g., from about 1 μm to about 1000 μm, from about 1 μm to about 100 μm, from about 100 μm to about 1000 μm, etc.

Aspect 11. The process or pigment particles defined in any one of the preceding aspects, wherein the silica and/or silicate material is characterized by any suitable BET surface area, or a BET surface area in any range disclosed herein, e.g., from about 1 $m^2/g$ to about 1200 $m^2/g$, from about 20 $m^2/g$ to about 600 $m^2/g$, from about 50 $m^2/g$ to about 500 $m^2/g$, etc.

Aspect 12. The process or pigment particles defined in any one of the preceding aspects, wherein the silica and/or silicate material is characterized by any suitable (mercury intrusion) pore volume, or a pore volume in any range disclosed herein, e.g., from about 0.5 cc/g to about 6 cc/g, from about 0.7 cc/g to about 5 cc/g, from about 0.8 cc/g to about 3 cc/g, etc.

Aspect 13. The process or pigment particles defined in any one of the preceding aspects, wherein the silica and/or silicate material is characterized by any suitable oil absorption, or an oil absorption value in any range disclosed herein, e.g., from about 30 cc/100 g to about 600 cc/100 g, from about 50 cc/100 g to about 400 cc/100 g, from about 60 cc/100 g to about 250 cc/100 g, etc.

Aspect 14. The process or pigment particles defined in any one of the preceding aspects, wherein the silica and/or silicate material is characterized by suitable pH, or a pH in any range disclosed herein, e.g., from about 3 to about 10.5, from about 5 to about 9, from about 6 to about 8, etc.

Aspect 15. The process or pigment particles defined in any one of the preceding aspects, wherein the silica and/or silicate material is characterized by suitable zeta potential, or a zeta potential in any range disclosed herein, e.g., from about −2 mV to about −70 mV, from about −15 mV to about −65 mV, from about −10 mV to about −60 mV, etc.

Aspect 16. The process or pigment particles defined in any one of the preceding aspects, wherein the colored pigment particles are substantially free of a binder, e.g., less than 1 wt. %, less than 0.5 wt. %, less than 0.1 wt. %, zero, etc., and non-limiting examples of binders include polyvinyl alcohols and the like.

Aspect 17. The process or pigment particles defined in any one of aspects 1-16, wherein the colored pigment particles are wet, e.g., a slurry comprising greater than 40 wt. % of any suitable liquid, e.g., water, an organic solvent, etc.

Aspect 18. The process or pigment particles defined in any one of aspects 1-16, wherein the colored pigments particles are dry, e.g., comprising less than 70 wt. %, less than 40 wt. %, less than 10 wt. %, less than 5 wt. %, etc., of any liquid, e.g., water, an organic solvent, etc.

Aspect 19. The process or pigment particles defined in any one of aspects 1-16, wherein the colored pigments particles are free-flowing.

Aspect 20. The process or pigment particles defined in any one of aspects 1-19, wherein the silica and/or silicate material comprises any suitable silica gel or any silica gel disclosed herein, such as those produced by Grace (e.g., SYLOID, SYLODENT), PQ Corporation (e.g., GASIL, SILCRON, SORBSIL), etc.

Aspect 21. The process or pigment particles defined in any one of aspects 1-19, wherein the silica and/or silicate material comprises any suitable fumed silica or any fumed silica disclosed herein, such as those produced by Cabot Corporation (e.g., CABOSIL), Evonik Industries (e.g., AEROSIL), etc.

Aspect 22. The process or pigment particles defined in any one of aspects 1-19, wherein the silica and/or silicate material comprises any suitable precipitated silica or any precipitated silica disclosed herein, such as those produced by J.M. Huber Corporation (e.g., ZEODENT, ZEOFREE, ZEOTHIX), Grace (e.g., SYLODENT), PQ Corporation (e.g., SORBOSIL), Solvay (e.g., TIXOSIL, ZEOSIL), Evonik Industries (e.g., SIDENT, SIPERNAT), etc.

Aspect 23. The process or pigment particles defined in any one of aspects 1-19, wherein the silica and/or silicate material comprises any suitable aluminosilicate or any aluminosilicate disclosed herein, e.g., alkali metal aluminosilicate particles, alkaline earth metal-modified alkali metal aluminosilicate particles, as well as combinations thereof, such as those produced by J.M Huber Corporation (e.g., ZEOLEX, HYDREX, HUBERSORB), etc.

Aspect 24. The process or pigment particles defined in any one of aspects 1-19, wherein the silica and/or silicate material comprises sodium aluminosilicate particles.

Aspect 25. The process or pigment particles defined in any one of aspects 1-19, wherein the silica and/or silicate material comprises sodium magnesium aluminosilicate particles.

Aspect 26. The process or pigment particles defined in any one of aspects 1-19, wherein the silica and/or silicate material comprises calcium silicate and/or magnesium silicate particles.

Aspect 27. The process or pigment particles defined in any one of the preceding aspects, wherein the silica and/or silicate material is amorphous.

Aspect 28. The process or pigment particles defined in any one of the preceding aspects, wherein the silica and/or silicate material is synthetic.

Aspect 29. The process or pigment particles defined in any one of aspects 1-28, wherein the anionic dye comprises any suitable water soluble dye or any water soluble dye disclosed herein, e.g., Red 33, FD&C Red 3, FD&C Red 40, FD&C Blue 1, FD&C Yellow 5, FD&C Yellow 6, FD&C Green 3, etc., as well as combinations thereof.

Aspect 30. The process or pigment particles defined in any one of aspects 1-29, wherein the quaternary ammonium compound comprises any suitable polymeric quaternary ammonium compound or any polymeric quaternary ammonium compound disclosed herein, e.g., Poly-DADMAC, Poly-Quat, etc., as well as combinations thereof.

Aspect 31. The process or pigment particles defined in any one of aspects 1-29, wherein the quaternary ammonium compound comprises any suitable non-polymeric quaternary ammonium compound or any non-polymeric quaternary ammonium compound disclosed herein, e.g., cetylpyridinium chloride (CPC), cetyltrimethylammonium bromide (CTAB), benzalkonium chloride (BAC), etc., as well as combinations thereof.

Aspect 32. The process defined in any one of aspects 2-31, wherein an aqueous slurry of the silica and/or silicate material is contacted with the quaternary ammonium compound in step (a).

Aspect 33. The process defined in any one of aspects 2-32, further comprising a step of drying the treated particles after step (a).

Aspect 34. The process defined in any one of aspects 2-33, wherein the quaternary ammonium compound is contacted with the silica and/or silicate material at any suitable temperature and time period, or any temperature and time period disclosed herein, e.g., from about 10° C. to about 80° C., from about 20° C. to about 60° C., from about 15 sec to about 48 hr, from about 1 min to about 8 hr, from about 5 min to about 2 hr, etc.

Aspect 35. The process defined in any one of aspects 2-34, wherein an aqueous slurry of the treated particles is contacted with the anionic dye in step (b).

Aspect 36. The process defined in any one of aspects 2-35, further comprising a step of removing excess dye from the colored pigment particles, using any suitable technique or any technique disclosed herein, e.g., washing, etc.

Aspect 37. The process defined in any one of aspects 2-36, further comprising a step of isolating the colored pigment particles, using any suitable technique or any technique disclosed herein, e.g., filtration, drying, etc.

Aspect 38. The process defined in any one of aspects 2-37, further comprising a step of wet milling the colored pigment particles, using any suitable technique or any technique disclosed herein, e.g., bead milling, etc.

Aspect 39. The process defined in any one of aspects 2-38, further comprising a step of dry milling the colored pigment particles, using any suitable technique or any technique disclosed herein, e.g., hammer milling, etc.

Aspect 40. Colored pigment particles produced by the process defined in any one of aspects 2-39.

Aspect 41. The pigment particles defined in any one of aspects 1-31 and 40, wherein the colored pigment particles exhibit substantially no color bleed in water.

Aspect 42. The pigment particles defined in any one of aspects 1-31 and 40-41, wherein the colored pigment particles are yellow, red, blue, orange, green, etc., or combinations thereof.

Aspect 43. A composition comprising a liquid (e.g., water, an organic solvent) and the pigment particles defined in any one of aspects 1-31 and 40-42.

Aspect 44. An article of manufacture comprising the pigment particles defined in any one of aspects 1-31 and 40-42.

We claim:

1. Colored pigment particles comprising:
(i) a silica and/or silicate material having a negative zeta potential;
(ii) an anionic dye; and
(iii) a quaternary ammonium compound; wherein:
a ratio of the quaternary ammonium compound to the silica and/or silicate material is in a range from about 50% to 300% of the amount, by weight, of the quaternary ammonium compound sufficient to achieve a zero my zeta potential of a 1 wt. % mixture of the dry silica and/or silicate material in deionized water; and
a weight ratio of the anionic dye is in a range from about 0.02:1 to 0.24:1, based on the weight of the quaternary ammonium compound.

2. The pigment particles of claim 1, wherein:
the ratio of the quaternary ammonium compound to the silica and/or silicate material is in a range from about 75% to about 175% of the amount, by weight, of the quaternary ammonium compound sufficient to achieve a zero mV zeta potential of a 1 wt. % mixture of the dry silica and/or silicate material in deionized water; and
the weight ratio of the anionic dye is in a range from about 0.04:1 to 0.24:1, based on the weight of the quaternary ammonium compound.

3. The pigment particles of claim 1, wherein:
the colored pigment particles are characterized by a pH in a range from about 5 to about 9;
the ratio of the quaternary ammonium compound to the silica and/or silicate material is in a range from about 75% to about 200% of the amount, by weight, of the quaternary ammonium compound sufficient to achieve a zero mV zeta potential of a 1 wt. % mixture of the dry silica and/or silicate material in deionized water; and
the weight ratio of the anionic dye is in a range from about 0.02:1 to about 0.18:1, based on the weight of the quaternary ammonium compound.

4. The pigment particles of claim 1, wherein the colored pigment particles are characterized by:
an average particle size in a range from about 1 μm to about 1000 μm, a BET surface area in a range from about 1 m²/g to about 1200 m²/g;
an oil absorption value in a range from about 30 cc/100 g to about 600 cc/100 g;
a pH in a range from about 3 to about 10.5; and
a pack density in a range from about 3 lb/ft³ to about 60 lb/ft³.

5. The pigment particles of claim 1, wherein the silica and/or silicate material comprises a precipitated silica.

6. The pigment particles of claim 1, wherein the silica and/or silicate material comprises alkali metal aluminosilicate particles, alkaline earth metal-modified alkali metal aluminosilicate particles, or combinations thereof.

7. The pigment particles of claim 1, wherein the silica and/or silicate material is characterized by:
an average particle size in a range from about 1 μm to about 1000 μm;
a BET surface area in a range from about 1 m²/g to about 1200 m²/g;
a pore volume in a range from about 0.5 cc/g to about 6 cc/g;
an oil absorption value in a range from about 30 cc/100 g to about 600 cc/100 g;
a pH in a range from about 3 to about 10.5; and
a zeta potential in a range from about −2 mV to about −70 mV.

8. The pigment particles of claim 1, wherein the colored pigment particles are substantially free of a binder.

9. The pigment particles of claim 1, wherein the colored pigment particles are free-flowing.

10. The pigment particles of claim 1, wherein the anionic dye comprises Red 33, FD&C Red 3, FD&C Red 40, FD&C Blue 1, FD&C Yellow 5, FD&C Yellow 6, FD&C Green 3, or combinations thereof.

11. The pigment particles of claim 1, wherein the quaternary ammonium compound comprises a polymeric quaternary ammonium compound.

12. The pigment particles of claim 1, wherein the quaternary ammonium compound comprises a non-polymeric quaternary ammonium compound.

13. The pigment particles of claim 1, wherein the colored pigment particles exhibit substantially no color bleed in water.

14. The pigment particles of claim 1, wherein the colored pigment particles are yellow, red, blue, orange, green, or combinations thereof.

15. A composition comprising the pigment particles of claim 1.

16. The pigment particles of claim 2, wherein:
the silica and/or silicate material comprises a precipitated silica, and
the quaternary ammonium compound comprises cetylpyridinium chloride (CPC), cetyltrimethylammonium bromide (CTAB), benzalkonium chloride (BAC), or any combination thereof.

17. The pigment particles of claim 16, wherein:
the colored pigment particles are free-flowing; and
the colored pigment particles exhibit substantially no color bleed in water.

18. The pigment particles of claim 17, wherein the colored pigment particles are characterized by:
an average particle size in a range from about 1 μm, to about 1000 μm;
a BET surface area in a range from about 1 m²/g to about 1200 m²/g;
an oil absorption value in a range from about 30 cc/100 g to about 600 cc/100 g;
a pH in a range from about 3 to about 10.5; and
a pack density in a range from about 3 lb/ft³ to about 60 lb/ft³.

19. The pigment particles of claim 3, wherein:
the silica and/or silicate material comprises a precipitated silica; and
the quaternary ammonium compound comprises cetylpyridinium chloride (CPC), cetyltrimethylammonium bromide (CTAB), benzalkonium chloride (BAC), or any combination thereof.

20. A composition comprising the pigment particles of claim 19, wherein the colored pigment particles exhibit substantially no color bleed in water.

* * * * *